(12) United States Patent
    Tu

(10) Patent No.: US 11,314,894 B2
(45) Date of Patent: Apr. 26, 2022

(54) MULTI-ANDROID SYSTEM IMPLEMENTATION METHOD, NON-TRANSITORY COMPUTER-READABLE STORAGE MEDIUM, AND TERMINAL

(71) Applicant: HUIZHOU TCL MOBILE COMMUNICATION CO., LTD., Huizhou (CN)

(72) Inventor: Binjian Tu, Huizhou (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 175 days.

(21) Appl. No.: 16/632,338

(22) PCT Filed: Jul. 20, 2018

(86) PCT No.: PCT/CN2018/096360
    § 371 (c)(1),
    (2) Date: Jan. 18, 2020

(87) PCT Pub. No.: WO2019/019954
    PCT Pub. Date: Jan. 31, 2019

(65) Prior Publication Data
    US 2020/0175196 A1    Jun. 4, 2020

(30) Foreign Application Priority Data
    Jul. 26, 2017 (CN) .......................... 201710617372.2

(51) Int. Cl.
    *G06F 21/00* (2013.01)
    *G06F 21/62* (2013.01)
    *G06F 21/52* (2013.01)

(52) U.S. Cl.
    CPC .......... *G06F 21/6245* (2013.01); *G06F 21/52* (2013.01); *G06F 2221/033* (2013.01)

(58) Field of Classification Search
    CPC . G06F 21/6245; G06F 21/52; G06F 2221/033
    See application file for complete search history.

(56) References Cited

U.S. PATENT DOCUMENTS

2011/0107426 A1* 5/2011 Yen ........................ G06F 9/4812
                                                          726/26
2018/0348947 A1* 12/2018 Li .......................... G06F 3/0416

FOREIGN PATENT DOCUMENTS

CN        102110023 A     6/2011
CN        103136052 A     6/2013
                (Continued)

OTHER PUBLICATIONS

International Search Report For related International Application No. PCT/CN2018/096360 dated Oct. 25, 2018;(2 pages).

*Primary Examiner* — Ghazal B Shehni

(57) ABSTRACT

The present disclosure provides a multi-Android system implementation method, a non-transitory computer-readable storage medium, and a terminal provided. The method may include the following operations: starting a switching interface for a user to select any one of Android systems, when a terminal receives a user operation instruction; sending control information of an operating system to a driver layer, when the switching interface detects the any one of Android systems selected or created by the user; controlling a foreground program by the driver layer, to switch to the any one of the Android systems selected or created by the user; reading data from a virtual input device by the any one of the Android systems, and sending the data to an application in an own environment of the any one of Android systems.

18 Claims, 3 Drawing Sheets

(56) References Cited

FOREIGN PATENT DOCUMENTS

| CN | 103593185 | * | 2/2014 |
| CN | 103677989 A | | 3/2014 |
| CN | 106020829 A | | 10/2016 |
| CN | 107341407 A | | 11/2017 |

* cited by examiner

MULTI-ANDROID SYSTEM IMPLEMENTATION METHOD, NON-TRANSITORY COMPUTER-READABLE STORAGE MEDIUM, AND TERMINAL

CROSS-REFERENCE TO RELATED APPLICATIONS

The present application is a 35 U.S.C. § 371 National Phase conversion of International (PCT) Patent Application No. PCT/CN2018/096360 filed on Jul. 20, 2018, which claims foreign priority to Chinese Patent Application No. 201710617372.2, filed on Jul. 26, 2017 in the China. National Intellectual Property Administration, the entire contents of which are hereby incorporated by reference.

FIELD

The described embodiments relate to a communication technology, and more particularly, to a multi-Android system implementation method, a non-transitory computer-readable storage medium, and a terminal.

BACKGROUND

With a popularization of smart devices, configurations of smart mobile terminals (such as mobile phones, tablet computers, and so on) are gradually increasing, and user's requirements are becoming various. Requirements for low coupling and high independence on mobile terminals are becoming more common. After some investigations, a "privacy mode" has been appeared in terminal devices on the market, i.e., certain data is treated differently on a terminal, and access to the data is permitted by certain restrictions. Its advantage is simple to implement, but its disadvantage is poor compatibility with a multi-user mode of Android. A native multi-user mode to an Android system is just a high-coupling and low-security multi-user operation of one terminal. There are many cases involved in such as leakage of privacy, data, and so on, between users. In general, the multi-user mode of Android is implemented by modifying, adding interfaces, and adding driver interfaces, but it is easy for third-party applications to inject code through an interface to create context packages, and tamper with the interface to read data. Security is low.

Therefore, the related art needs to be further improved.

SUMMARY

In view of the above-mentioned deficiencies of the related art, a purpose of the present disclosure is to provide a multi-Android system implementation method, a non-transitory computer-readable storage medium, and a terminal. The method may implement a set of the multi-Android system based on hardware. The method may support a single system multi-user mode and a multi-system multi-user mode. The method may prevent third-party applications from injecting code to call private data. The method may also have high security, and meet requirements of a multiple-operating system required low coupling and high security in high-end phones.

In order to achieve the above-mentioned purpose, the present disclosure adopts the following technical solutions.

A multi-Android system implementation method, includes the following operations: block B, starting a switching interface for a user to select any one of Android systems, when a terminal receives a user operation instruction; block C, sending control information of an operating system to a driver layer, when the switching interface detects the any one of Android systems selected or created by the user; block D, controlling a foreground program by the driver layer, to switch to the any one of the Android systems selected by the user; block F, reading data from a virtual input device by the any one of the Android systems, and sending the data to an application in an own environment of the any one of Android systems.

In the multi-Android system implementation method, before the block B, the method further includes: block A, starting an Android system normally.

In the multi-Android system implementation method, the block D includes: block D1, creating a virtual input device interface configured to monitor the virtual input device, and corresponding to the any one of Android systems, by the driver layer, when the any one of Android systems is started; block D2, monitoring data output from the any one of Android systems, by the virtual input device interface; block D3, switching to the any one of Android systems selected by the user.

In the multi-Android system implementation method, the block D2 includes: block D21, opening an own virtual input device of the any one of Android systems, by the any one of Android systems; block D22, outputting data to the virtual input device interface of the driver layer.

In the multi-Android system implementation method, after the block D, the method further includes: block E, controlling the current Android system to enter a screen-off state by the driver layer, and controlling the any one of the Android systems selected or created by the user to enter the screen-on state.

In the multi-Android system implementation method, the block F includes: block F1, reading virtual input device data by the any one of Android systems; block invoking an Android system process in the own environment of the any one of Android systems; block F3, sending the virtual input device data to an application in the own environment of the any one of Android systems.

In the multi-Android system implementation method, wherein a hardware abstraction layer adds Socket ports corresponding to the multi-Android system, through a Socket communication fork process; the Socket ports are configured to create an own Android process of any one of Android systems by the any one of Android systems.

In the multi-Android system implementation method, the multi-Android system is constructed based on a same system image or multiple system images.

A non-transitory computer-readable storage medium is configured to store a computer program, and the computer program is configured to be executed any one of the above-mentioned methods.

A terminal, includes a processor, and a memory communicatively connected to the processor, and the memory is configured to store a computer program, and the computer program is configured to be executed any one of the above-mentioned methods. The processor is configured to call the computer program in the memory to implement any one of the above-mentioned methods.

Beneficial effects of the present disclosure are described as the following. In the multi-Android system implementation method, the non-transitory computer-readable storage medium, and the terminal provided by the present disclosure, the method includes the following operations: starting a switching interface for a user to select any one of Android systems, when a terminal receives a user operation instruction; sending control information of an operating system to a driver layer, when the switching interface detects the any one of Android systems selected or created by the user; controlling a foreground program by the driver layer, to switch to the any one of the Android systems selected or created by the user; reading data from a virtual input device by the any one of the Android systems, and sending the data to an application in an own environment of the any one of Android systems. By constructing a single-device multi-Android (two or more) system, and by adopting an underlying kernel system and some hardware abstraction layers at a software level, the present disclosure may implement a single-device multi-Android system with a multi-interface, low coupling, and highly independent. A multi-Android system in hardware may be more completely implemented, without needing to specifically support an Android's multi-user mode. The method may support a single system multi-user or multi-system multi-user. Since no user-level interface is exposed, third-party applications and other methods cannot inject code to private data by methods such as create package context, so that security may be high. The multi-Android system may switch between multiple systems directly at an underlying kernel system (i.e., the Linux system) or a driver layer by adding a virtual button or a hardware button. No related switching process will interfere with any Android system, and the underlying kernel system or the driver layer may directly complete the switching. The Android systems hardly affect each other. Even if one of the Android systems crashes and needs to be restarted, only the one of the Android systems may need to restart, and the underlying Linux system may still work normally. Therefore, other Android systems under Linux monitoring may still work normally.

DETAILED DESCRIPTION

The present disclosure will be further described in detail below with reference to the drawings and embodiments. It is understood that the specific embodiments described herein are merely illustrative of the disclosure and are not intended to limit the disclosure.

Figure 1:
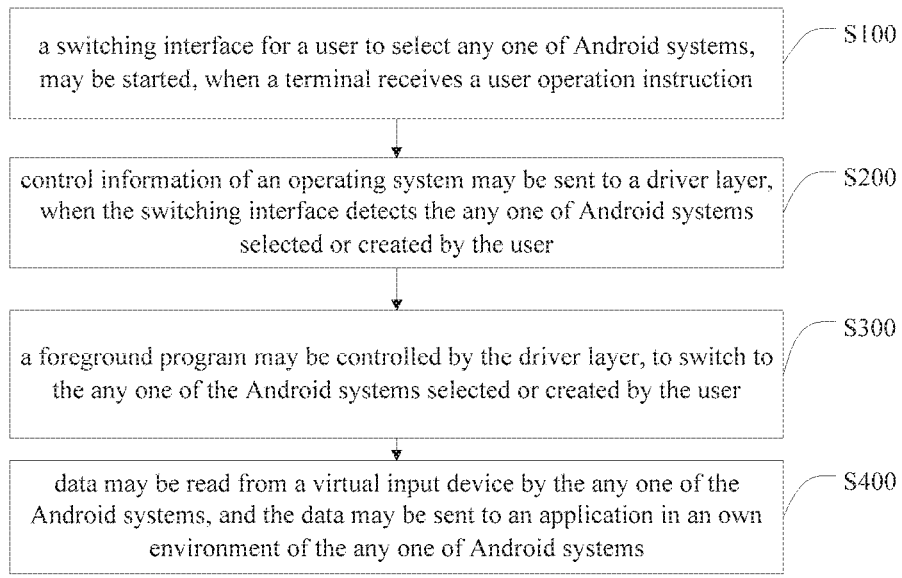
FIG. 1 is a flow chart of a multi-Android system implementation method in accordance with an embodiment in the present disclosure.
Figure 2:
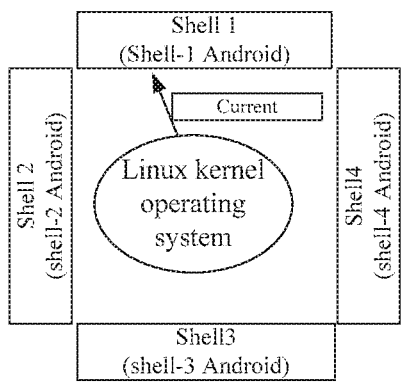
FIG. 2 is a schematic diagram of a relationship between an underlying Linux system and each Android system, of a multi-Android system implementation method in accordance with an embodiment in the present disclosure.

Referring to FIG. 1 and FIG. 2, FIG. 1 is a flow chart of a multi-Android system implementation method in accordance with an embodiment in the present disclosure, and FIG. 2 is a schematic diagram of a relationship between an underlying Linux system and each Android system, of a multi-Android system implementation method in accordance with an embodiment in the present disclosure. As shown in FIG. 1 and FIG. 2, the method may include operations in the following blocks. Block S100, a switching interface for a user to select any one of Android systems, may be started, when a terminal receives a user operation instruction.

Block S200, control information of an operating system may be sent to a driver layer, when the switching interface detects the any one of Android systems selected or created by the user.

Block S300, a foreground program may be controlled by the driver layer, to switch to the any one of the Android systems selected or created by the user.

Block S400, data may be read from a virtual input device by the any one of the Android systems, and the data may be sent to an application in an own environment of the any one of Android systems.

In an Android system of a general terminal, there may be a relationship between each of the applications, and between an application and an Android system. The relationship may be that one Android system can run multiple applications, such as "App-1", "App-2", "App-3", and "App-4". Each of the applications may run independently, and each of the applications and the Android system may be independent and connected. An application that is running in the foreground and is displayed to a user, is what a user currently selects. In the same way, a multi-Android system may be considered as multiple "applications" on a Linux operating system, and the Linux operating system may be a kernel system. It may infer to the architecture shown in FIG. 2. Referring to FIG. 2, a bottom layer of Android may be a Linux operating system, and a driver terminal may run a Linux kernel operating system (including a driver layer). Each Android system may actually be regarded as an application on the Linux operating system in a large JAVA architecture (including JNI modules). The JAVA architecture may refer to a collection of some classes and interfaces. A series of program may be implemented by a coordination of the classes and the interfaces. The JAVA architecture may be divided into three layers: a presentation layer, a business layer, and a physical layer. For easy understanding, shells of an Android system may be named as a shell 1 (shell-1 Android), a shell 2 (shell-2 Android), a shell 3 (shell-3 Android), and a shell 4 (shell-4 Android). For example, a "current" of a shell which located in a center of each "shell" may refer to the Android system that a foreground currently selected by a user, is running and displayed to the user, and called "shell-1 Android" or "shell 3 (shell-3 Android)", and so on. In fact, each Android system may be a shell for an underlying Linux kernel operating system, i.e., a "shell" with a diverse interface (UI) display and a built-in ecosystem architecture. This may be just like a JAVA virtual machine. The multiple JAVA virtual machines may be run independently in a system. By adjusting to an architecture, so that a Linux operating system may run multiple Android systems independently. In at least one embodiment, a plurality of Android systems may be limited to a maximum of four.

According to the experience of switching applications on an Android system, when a recent button is pressed, a recent activity may be displayed. There are two methods to switch between applications in an Android. Method 1, when there is currently only one application, the application cannot be switched. In this case, it may restart a new application to "switch" to another application. Method 2, when there are currently multiple applications, the multiple applications may be switched by a recent key of an Android system. Similarly, to switch between shells may be similar to switch between applications in an Android system. A boom key may be configured, which may be a virtual key or a button added on hardware. The boom key may be a button with a function of explosion, which may wake up different functions when a terminal is in different states. For example, when a screen is locked, the screen may be unlocked and take a picture; in a main interface, a current weather animation may be activated; in a music application, bass and volume may be enhanced; in a photo album, stickers may be created immediately. The button may be similar to a recent key in most Android system terminals on the market, but its function may be to switch between shells.

Specifically, when the button with the function of explosion is pressed, a hardware driver may receive a notification, thereby a new security interface may be invoked. The security interface may be similar to the recent-activity list of an Android system, i.e., when the button with the function of explosion is pressed, a shell switch secure UI configured to select any one of multi-Android system for a user, may be invoked. The shell switch secure UI, like other shells of an Android system, may be a native process, which may be transparent to each shell and may be not monitored by an underlying kernel driver. The shell switch secure UI may be only responsible for monitoring to a single underlying device (such as/dev/input/boom_key) and receiving its information. Under normal circumstances, when a shell is selected by a user, the shell may automatically be hidden in a background. The shell may not consume system resources. The shell switch secure UI may belong to a local program of a Linux system (or a program completed based on other virtual machine platforms). The shell switch secure UI may not have any relationships with the shell, but may only accept events initiated from the button with the function of explosion. Since a terminal does not accept events from any program in a non-root situation, it may be considered to be safe.

Therefore, in an embodiment, when a user selects a (or creates a new) shell by the button with the function of explosion to invoke the shell switch secure UI, the shell switch secure UI may send a message to a driver layer in an operating system through a control code ioctl. After the driver layer performs a series of operations, the foreground program may be switched to the shell selected or created by the user.

Therefore, by constructing the single-device multi-Android (two or more) system, and by adopting the underlying kernel system and some hardware abstraction layers at the software level, the present disclosure may implement the single-device multi-Android system with the multi-interface, the low coupling, and the highly independent. The multi-Android system in a set of hardware may be more completely implemented, without needing to specifically support the Android's multi-user mode. The method may support the single system multi-user or multi-system multi-user. Security may be high, the method may meet requirements of the low coupling and the highly independent in high-end mobile phones with a multi-operating systems. Transparency may be required between two interfaces or users. The low coupling and the highly independent may be required between data. There may be a large demand space for high-end smart phones and multi-interface smart phones with high security requirements.

Figure 3:
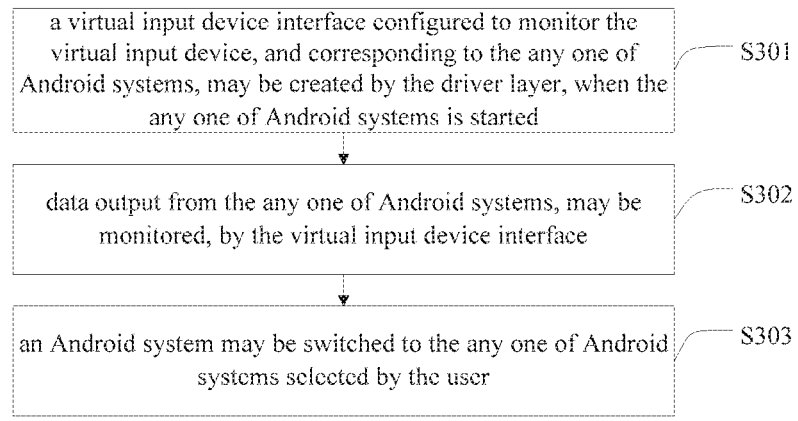
FIG. 3 is a working flow chart of switching an Android system in a multi-Android system implementation method in the present disclosure.

Further, referring to FIG. 3, block S300 may include operations in the following blocks.

Block S301, a virtual input device interface configured to monitor the virtual input device, and corresponding to the any one of Android systems, may be created by the driver layer, when the any one of Android systems is started.

Block S302, data output from the any one of Android systems, may be monitored, by the virtual input device interface.

Block S303, an Android system may be switched to the any one of Android systems selected by the user.

In an embodiment of the present disclosure, in order to ensure consistency of part of shell code and reduce the impact, a driver layer may create a virtual input device interface corresponding to any one of the Android systems when the any one of the Android systems is started. The interface may be configured to monitor a virtual input device. The virtual input device interface may start to monitor data output from any one of the Android systems, i.e., an operation that an Android system is switched to any one of the Android systems selected or created by the user, may be completed. Block S302 may further include a operation that, an own virtual input device of the any one of Android systems may be opened, by the any one of Android systems; data may be output to the virtual input device interface of the driver layer. When the switching is completed, the driver layer may control the current Android system to enter a screen-off state, and may control the any one of the Android systems selected or created by the user to enter the screen-on state.

Figure 4:
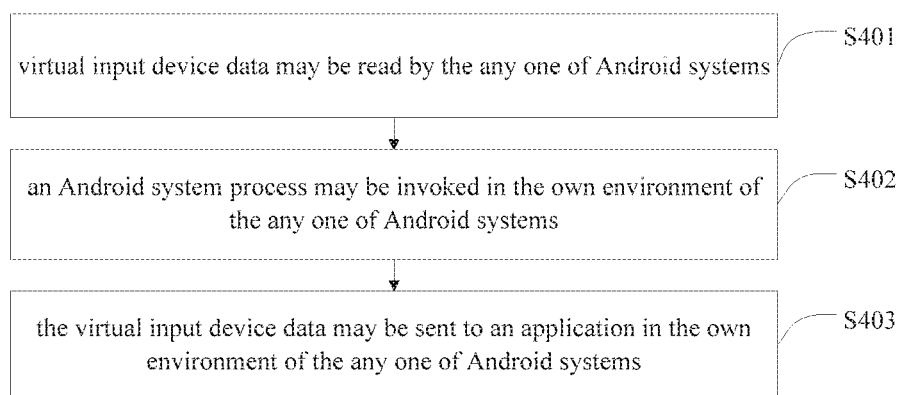
FIG. 4 is a flow chart of a multi-Android system implementation method to enable an own application of any one of Android systems by the any one of Android systems, in accordance with an embodiment in the present disclosure.

Further, referring to FIG. 4, block S400 may include operations in the following blocks.

Block S401, virtual input device data may be read by the any one of Android systems.

Block S402, an Android system process may be invoked in the own environment of the any one of Android systems.

Block S403, the virtual input device data may be sent to an application in the own environment of the any one of Android systems.

In an embodiment of the present disclosure, virtual input device data may be read by the any one of Android systems. An Android system process may be invoked in an own environment of the any one of Android systems. The virtual input device data may be sent to an application in the own environment of the any one of Android systems. A hardware abstraction layer may add Socket ports corresponding to the multi-Android system through a Socket communication fork process, The Socket ports may be configured to create an own Android process by any one of Android systems, in other words, the hardware abstraction layer (HAL) may use the Socket communication fork process to make a local file Socket automatically adopted to a Socket port for any one of Android systems based on a current number of the any one of Android systems, The any one of Android systems may create an own Android process, and a zygote process adoption may be completed.

Further, the multi-Android system may be constructed based on a same system image or multiple system images. The system may be not a system image (System.img) compiled by a native installation system. The system may be a system image that is only available for shells loaded after being trimmed. When a part of the system between a driver layer and an underlying kernel system, is separated, it may be a single unified system image, it may have advantages that are simple and space saving, but it may lack personalization between multiple shells. In an Android with multiple shells based on multiple system images, it may have advantages that there may be a high degree of personalization and differentiation between multiple shells, and security between the shells may be higher, because the shells come from different system images. The disadvantage may be that each system image may take up space, and may eventually cause the entire read-only memory (ROM) to be bloated. The ROM is an abbreviation of read-only memory. The ROM is a solid-state semiconductor memory that may only read data stored in advance. A characteristic of the ROM is that once data is stored, and the stored data may not be changed or deleted, so that The ROM is usually used in an electronic or a computer system that data does not be changed often, and the data does not disappear when the power of the electronic or the computer system is turned off. The architecture of the ROM is simple and data in the ROM may be easy to read, so that the ROM is often used to store various fixed programs and data. A dynamic selection scheme may be adopted in the present disclosure, i.e., the multi-Android system may be constructed based on a same system image or multiple system images. The dynamic selection scheme may have a high degree of flexibility. There may be system images of a multiple system in the underlying kernel, but the shell may be dynamically selected one of them to start. The shell may be differentiated into multiple shells that are all derived from one system image, or based on completely different system images, so that the shell may be flexible and various.

Figure 5:
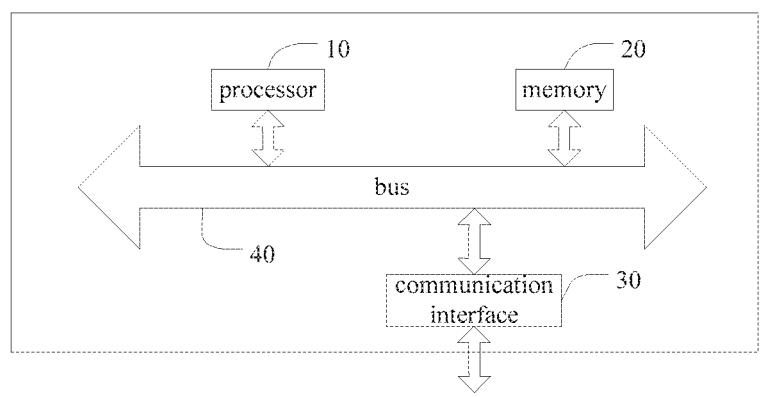
FIG. 5 is a functional principle block diagram of a terminal in the present disclosure.

The present disclosure further provides a terminal. Referring to FIG. 5, the terminal may include a processor 10, a memory 20, a communication interface 30, and a bus 40.

The processor 10, the memory 20, and the communication interface 30 may complete communication with each other through the bus 40.

The communication interface 30 may be configured to transmit information between communication devices of the terminal.

The processor 10 may be configured to call a computer program in the memory 20 to execute the method provided by the above-mentioned embodiments. For example, the method may include the following operations: starting a switching interface for a user to select any one of Android systems, when a terminal receives a user operation instruction; sending control information of an operating system to a driver layer, when the switching interface detects the any one of Android systems selected or created by the user; controlling a foreground program by the driver layer, to switch to the any one of the Android systems selected or created by the user; reading data from a virtual input device by the any one of the Android systems, and sending the data to an application in an own environment of the any one of Android systems.

The present disclosure further provides a non-transitory computer-readable storage medium. The non-transitory computer-readable storage medium may store a computer program. The computer program may be configured to be executed to implement a terminal-based multi-Android system implementation method.

In summary, the present disclosure provides the multi-Android system implementation method, the non-transitory computer-readable storage medium, and the terminal. The method includes the following operations: starting the switching interface for the user to select the any one of Android systems, when the terminal receives the user operation instruction; sending the control information of the operating system to the driver layer, when the switching interface detects the any one of Android systems selected or created by the user; controlling the foreground program by the driver layer, to switch to the any one of the Android systems selected or created by the user; reading the data from the virtual input device by the any one of the Android systems, and sending the data to the application in the own environment of the any one of Android systems. By constructing a single-device multi-Android (two or more) system, and by adopting an underlying kernel system and some hardware abstraction layers at a software level, the present disclosure may implement a single-device multi-Android system with a multi-interface, low coupling, and highly independent. The method may support a single system multi-user mode and a multi-system multi-user mode, and may prevent third-party applications from injecting code to call private data. The method may be high security, and may meet requirements of multiple operating systems required low coupling and high security in high-end phones.

A person of ordinary skill in the art may understand that the implementation of all or part of the processes in the method in the above-mentioned embodiments may be completed by using a computer program to instruct related hardware (such as a processor, a controller, and so on). The computer program may be stored in a computer, or in a storage medium. When the program is executed, the program may include the processes of the method in the above-mentioned embodiments. The storage medium may be a memory, a magnetic disk, an optical disk, or the like.

It should be understood that, those skilled in the art may make equivalent substitutions or changes to the embodiments in the present disclosure, and all such changes or substitutions belong to the scope of the appended claims.

What is claimed is:

1. A terminal, comprising:
a processor, and
a memory communicatively connected to the processor;
wherein the memory is configured to store a computer program;
the computer program is configured to implement a terminal-based multi-Android system implementation method when executed;
the processor is configured to call the computer program in the memory to implement the terminal-based multi-Android system implementation method;
the multi-Android system is constructed based on a same system image or multiple system images; and the multi-Android system implementation method comprises the following operations:
block A, starting an Android system normally;
block B, starting a switching interface for a user to select any one of Android systems, when the terminal receives a user operation instruction;
block C, sending control information of an operating system to a driver layer, when the switching interface detects the any one of Android systems selected or created by the user;
block D, controlling a foreground program by the driver layer, to switch to the any one of the Android systems selected or created by the user;
block E, controlling the current Android system to enter a screen-off state by the driver layer, and controlling the any one of the Android systems selected or created by the user to enter the screen-on state;
block F, reading data from a virtual input device by the any one of the Android systems, and sending the data to an application in an own environment of the any one of Android systems; wherein a hardware abstraction layer adds Socket ports corresponding to the multi-Android system, through a Socket communication fork process; the Socket ports are configured to create an own Android process by any one of Android systems.

2. The terminal according to claim 1, wherein the block D comprises:
block D1, creating a virtual input device interface configured to monitor the virtual input device, and corresponding to the any one of Android systems, by the driver layer, when the any one of Android systems is started;

block D2, monitoring data output from the any one of Android systems, by the virtual input device interface;

block D3, switching to the any one of Android systems selected by the user.

3. The terminal according to claim 2, wherein the block D2 comprises:

block D21, opening an own virtual input device of the any one of Android systems by the any one of Android systems;

block D22, outputting data to the virtual input device interface of the driver layer.

4. The terminal according to claim 1, wherein the block F comprises:

block F1, reading virtual input device data by the any one of Android systems;

block F2, invoking an Android system process in the own environment of the any one of Android systems;

block F3, sending the virtual input device data to an application in the own environment of the any one of Android systems.

5. A multi-Android system implementation method performed in a terminal, comprising the following operations:

block B, starting a switching interface for a user to select any one of Android systems, when the terminal receives a user operation instruction;

block C, sending control information of an operating system to a driver layer, when the switching interface detects the any one of Android systems selected or created by the user;

block D, controlling a foreground program by the driver layer, to switch to the any one of the Android systems selected or created by the user;

block E, controlling the current Android system to enter a screen-off state by the driver layer, and controlling the any one of the Android systems selected or created by the user to enter the screen-on state; and block F, reading data from a virtual input device by the any one of the Android systems, and sending the data to an application in an own environment of the any one of Android systems.

6. The method according to claim 5, wherein before the block B, the method further comprises:

block A, starting an Android system normally.

7. The method according to claim 6, wherein the block D comprises:

block D1, creating a virtual input device interface configured to monitor the virtual input device, and corresponding to the any one of Android systems, by the driver layer, when the any one of Android systems is started;

block D2, monitoring data output from the any one of Android systems, by the virtual input device interface;

block D3, switching to the any one of Android systems selected by the user.

8. The method according to claim 7, wherein the block D2 comprises:

block D21, opening an own virtual input device of the any one of Android systems by the any one of Android systems;

block D22, outputting data to the virtual input device interface of the driver layer.

9. The method according to claim 5, wherein the block F comprises:

block F1, reading virtual input device data by the any one of Android systems;

block F2, invoking an Android system process in the own environment of the any one of Android systems;

block F3, sending the virtual input device data to an application in the own environment of the any one of Android systems.

10. The method according to claim 5, wherein a hardware abstraction layer adds Socket ports corresponding to the multi-Android system, through a Socket communication fork process; the Socket ports are configured to create an own Android process by any one of Android systems.

11. The method according to claim 5, wherein the multi-Android system is constructed based on a same system image or multiple system images.

12. A non-transitory computer-readable storage medium, configured to store a computer program; wherein the computer program is configured to be executed to implement a terminal-based multi-Android system implementation method; and the multi-Android system implementation method comprises the following operations:

block B, starting a switching interface for a user to select any one of Android systems, when a terminal receives a user operation instruction;

block C, sending control information of an operating system to a driver layer, when the switching interface detects the any one of Android systems selected or created by the user;

block D, controlling a foreground program by the driver layer, to switch to the any one of the Android systems selected or created by the user;

block E, controlling the current Android system to enter a screen-off state by the driver layer, and controlling the any one of the Android systems selected or created by the user to enter the screen-on state; and block F, reading data from a virtual input device by the any one of the Android systems, and sending the data to an application in an own environment of the any one of Android systems.

13. The non-transitory computer-readable storage medium according to claim 12, wherein before the block B, the method further comprises:

block A, starting an Android system normally.

14. The non-transitory computer-readable storage medium according to claim 13, wherein the block D comprises:

block D1, creating a virtual input device interface configured to monitor the virtual input device, and corresponding to the any one of Android systems, by the driver layer, when the any one of Android systems is started;

block D2, monitoring data output from the any one of Android systems, by the virtual input device interface;

block D3, switching to the any one of Android systems selected by the user.

15. The non-transitory computer-readable storage medium according to claim 14, wherein the block D2 comprises:

block D21, opening an own virtual input device of the any one of Android systems by the any one of Android systems;

block D22, outputting data to the virtual input device interface of the driver layer.

16. The non-transitory computer-readable storage medium according to claim 12, wherein the block F comprises:

block F1, reading virtual input device data by the any one of Android systems;

block F2, invoking an Android system process in the own environment of the any one of Android systems;

block F3, sending the virtual input device data to an application in the own environment of the any one of Android systems.

17. The non-transitory computer-readable storage medium according to claim 12, wherein a hardware abstraction layer adds Socket ports corresponding to the multi-Android system, through a Socket communication fork process; the Socket ports are configured to create an own Android process by any one of Android systems.

18. The non-transitory computer-readable storage medium according to claim 12, the multi-Android system is constructed based on a same system image or multiple system images.

* * * * *